Jan. 24, 1933.    H. W. BELL    1,894,972
FLEXIBLE COUPLING
Original Filed Jan. 30, 1922    2 Sheets-Sheet 1
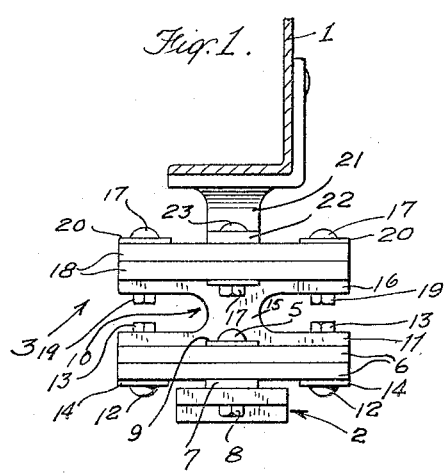
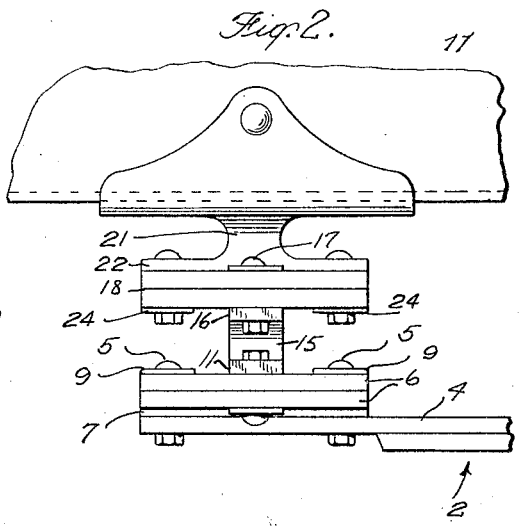
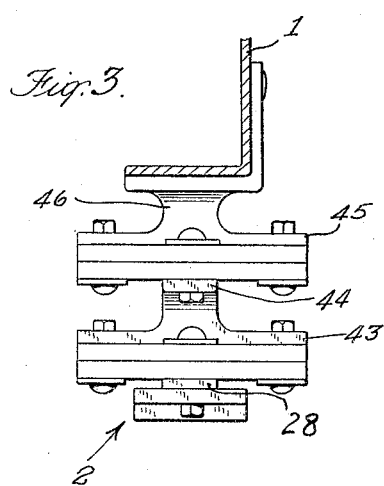
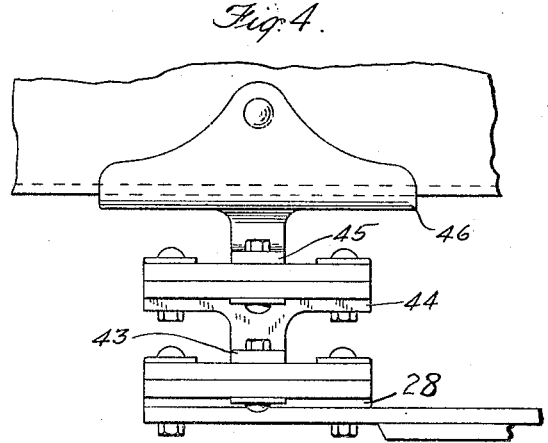
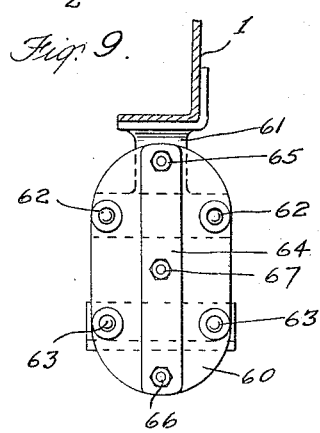
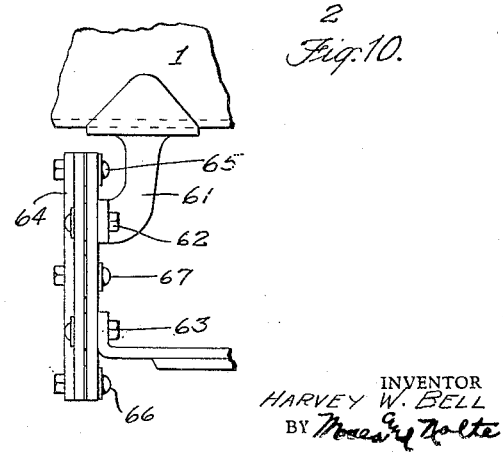
INVENTOR
HARVEY W. BELL
ATTORNEYS Jan. 24, 1933.　　　H. W. BELL　　　1,894,972
FLEXIBLE COUPLING
Original Filed Jan. 30, 1922　　2 Sheets-Sheet 2

INVENTOR
HARVEY W. BELL
BY Moses and Nolte
ATTORNEYS

Patented Jan. 24, 1933

1,894,972

UNITED STATES PATENT OFFICE

HARVEY W. BELL, OF ARDSLEY-ON-HUDSON, NEW YORK, ASSIGNOR TO THE BELOYT CORPORATION, OF NEW YORK, N. Y., A CORPORATION OF DELAWARE

FLEXIBLE COUPLING

Original application filed January 30, 1922, Serial No. 532,744. Divided and this application filed October 19, 1927. Serial No. 227,317.

This invention relates to flexible shackle connections, and particularly to connections adapted to permit relative bodily and pivotal movement between the connected members.

The invention is particularly designed to replace the pivoted links ordinarily employed between the spring and body of a motor vehicle, although it may obviously be used in other structures.

Generally stated, it is the aim of the invention to replace such pivoted links by separating or spacing means rigidly connected at the opposite ends thereof with the body and the spring through the medium of non-metallic material, capable of flexing so as to permit the spacing means to pivot or rock relative to the body and to the spring. Relative bodily movement of the body and the spring is thus provided for, without the interpositioning of any relatively movable metallic members in bearing engagement with one another.

Other objects and advantages will hereinafter appear.

The present application is a division of my pending application, Serial No. 532,744 for flexible connections, filed January 30, 1922.

In the drawings forming a part of this specification:

Figures 1 and 2 are end and side views respectively of one embodiment of the invention;

Figures 3 and 4 are similar views of a further embodiment of the invention

Figures 9 and 10 are sectional end and side elevations respectively of another embodiment wherein the separating element between the spring and body supports the body under compression.

Figure 5:
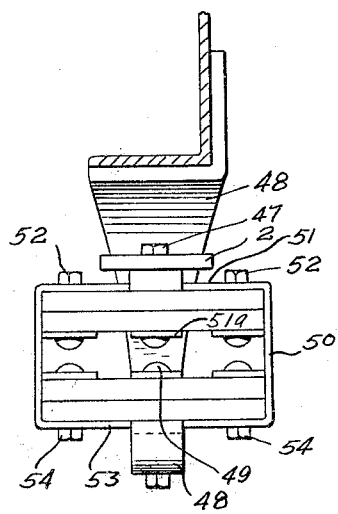
Figures 5 and 6 are sectional end and side views respectively of a still further embodiment of the invention.
Figure 6:
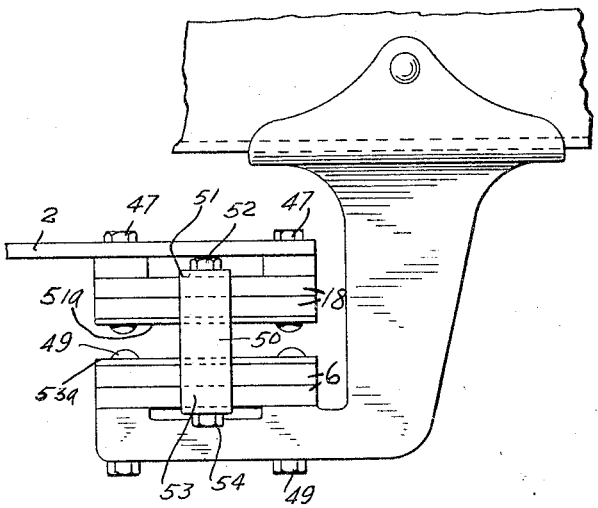

In the first form of the invention disclosed in Figures 1 and 2, the vehicle body 1 rests upon the leaf spring 2 through the shackle 3, so that the shackle supports the vehicle body in compression.

The master leaf 4 of the spring 2 is provided with openings therethrough for the passage of shackle securing bolts 5. Flexible, non-metallic, substantially inextensible plates or discs 6, which may desirably be composed of rubberized fabric, are mounted at the upper side of the spring leaf 4 upon a relatively narrow base plate 7, and are secured to the spring by the bolts 5 passed through the plates 6, base plate 7, and spring leaf 4, and secured by nuts 8. Washers 9 are desirably interposed between the flexible plate and the bolt heads. A compression spacer 10 of H-shape is mounted upon the upper face of the upper flexible plate 6. This spacer 10 comprises a base member 11 which extends diametrically across the flexible plates 6 substantially at right angles to the spring 1. At opposite ends of the base 11, threaded bolts 12 project through the flexible plate, and securement of the flexible plate to the spacer is effected by threading nuts 13 onto the upper ends of the bolts 12. For the purpose of increasing the grip upon the flexible plate, washers 14 are interposed between the nuts 13 and the lower flexible plate 6. The base member is relatively narrow, so that the flexible plate is free to flex intermediate its ends, and thereby to permit the spacer to rock in a fore and aft direction. Between the ends of the base 11 provision is made of an upwardly extending compression member or strut 15 which connects at its upper end with an upper base member 16 of the spacer which is narrow and extends parallel to the base member 11. Threaded bolts 17 extend downward through opposite ends of the upper base member 16 substantially in line with the struts 15 and have impaled upon them upper flexible plates or discs 18 similar to the plates 11 already described. The plates 18 are secured to the upper base member 16 by threading nuts 19 upon the bolts 17, and for the purpose of increasing the grip upon the flexible plate metallic washers 20 are interposed between the upper flexible plate and the heads of the bolts 17.

A body bracket 21 terminates in a lower horizontal portion 22 which extends substantially at right angles to the base members 10 and 11, and rests upon the upper flexible plate 18. Bolts 23 are passed downwardly through the front and rear end portions of the flexible plates 18, through the body portion 22, and through washers 24 at the lower side of the lower plate 18. Nuts 17 are threaded onto the lower ends of the bolts 23 for securing the ends of flexible plates 18 securely to the member 22.

It will be appreciated that rocking of the shackle 3 may be accommodated by the joint flexure of the lower and upper flexible plates 6 and 18 so that limited relative bodily movement of the spring 2 and body 1 is permitted.

The form of the invention disclosed in Figures 3 and 4 differs from that just described particularly in that the upper and lower arms of the intermediate member which connects the upper and lower sets of discs are turned at right angles to each other instead of being superposed one above the other, in the same plane. Thus while in this instance the lower bar 43 of the intermediate connecting member is secured to the periphery of the spring attached discs on a line transversely of the spring, the upper bar 44 of such member is disposed at a right angle thereto, and is secured to the periphery of the body attached discs on a line longitudinally of the spring and body, the bearing bar 45 of the body attached bracket 46 extending and being secured to the upper discs on a transverse plane. In this construction, therefore, the pivotal motion due to the ordinary flexing of the spring will take place at the transverse bearings 45 and 43 and rocking movements at right angles thereto will take place on the planes of the longitudinal bearings at 44 and 28.

The constructions thus far described are all of the compression type but the invention is adapted as well to connections of the suspension type, as I have endeavored to illustrate in Figures 5 to 8.

In the first illustrated of these latter types of the invention, two sets of discs are employed, the first or upper set being connected to the under side of the spring at peripheral points aligned longitudinally of the spring by the bolts 47, the lower set of discs being similarly connected at peripheral points aligned longitudinally of the spring and frame to the frame attached bracket 48 by the bolts 49 and the two sets of discs being connected by a transversely extending suspension link 50 of looped construction, having its upper arm 51 extending over the top of the upper discs and secured by bolts 52 to peripheral portions thereof and a lower arm 53 extending beneath the lower discs and clamped to the peripheral portions thereof by the bolts 54. The upper arm 51 of link 50 cooperates with a plate 51a and the lower arm 53 of the link cooperates with a plate 53a to transmit the load of the body to the spring, the fabric discs 18 and 6 being in compression between the said arms of the link and plates 51a and 53a.

Figure 7:
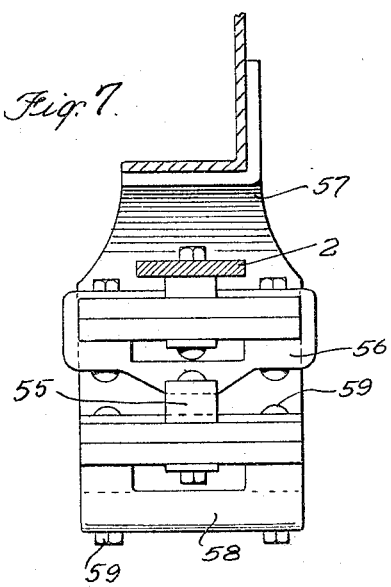
Figures 7 and 8 are sectional end and side views respectively of an embodiment of the invention wherein the separating member supports the body from the spring under tension.
Figure 8:
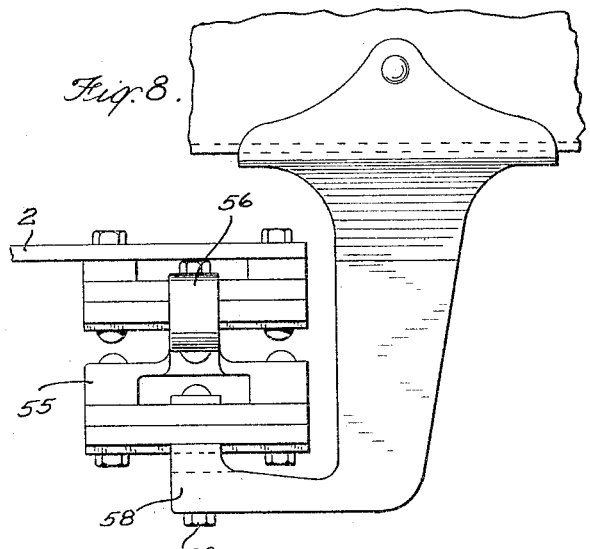

The structure of Figures 7 and 8 differs from the preceding principally in that the lower arm 55 of the connecting link is turned at right angles to the upper arm 56 so as to extend longitudinally of the spring and in that the body attached bracket 57 terminates in a transversely extending arm 58 secured to transversely opposite peripheral portions of the lower discs by bolts 59. With this construction the transverse flexure occurs in the plane of the upper arm of the connecting link and at the transverse attaching arm of the bracket while the longitudinal flexure takes place in the connecting plane of the spring attached bolts and along the line of the lower arm of the connecting link.

In the form of the invention illustrated in Figures 9 and 10, the flexible discs, which are here designated 60, are elongated in the nature of links and disposed vertically. The body attached bracket 61 is secured by transversely opposite horizontally aligned bolts 62 to the upper portion of these links and the spring is similarly secured by transversely opposite bolts 63 to the lower side edges of the links. The central intermediate portion of the links is traversed by a rigid vertical bar 64 secured to the upper and lower ends of the links by bolts 65 and 66 and also to a midlength point on the links by bolt 67. There are thus two quadrangularly arranged sets of fastenings at opposite ends of the link, the intermediate fastenings 67 being common to both such sets. With this construction transverse flexure can take place on the lines connecting the horizontally opposed fastenings 62 and 63 at the upper and the lower ends of the links, and a certain amount of flexure can take place along the vertical line connecting the bolts 65, 67, 66. The flat plane of the link is disposed in this construction so as to oppose side swaying movements of the vehicle body and for that reason this link is particularly useful where it is desired to overcome such tendencies. It will be observed that in Figs. 9 and 10 the shackle as a whole is shown as sustaining the load of the body in compression. It will be understood, however, that the same shackle construction may be employed to act as a suspension link for suspending the body of the spring.

The embodiments of the invention shown are links or connections of both compression and suspension types, designed to be used between the frames and springs of vehicles, but the invention obviously is broad enough to supply other needs.

It will be noted that under load conditions that part of the disc or discs which lies directly between the crossed bearing members is in compression and operates in effect as a flexible or resilient cushion carrying the weight of the car. As the bearings simply have a rocking or rolling motion on this cushion there is no particular wearing tendency at this point, but even should wear occur here, this simply means that the thickness of the cushion is reduced and this without affecting the actual coupling between the parts, provided by the flexible quadrants between the rigidly held portions of the disc or discs. It will also be noted that in the wearing down or further compression of the cushion portion at the center of the discs, possible looseness due to stretching of the material will be automatically taken up and in a sense compensated.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

What I claim is:

1. A pivotal connection for cooperating members comprising flexible disc-like connecting members, means for rigidly securing separated portions of one of said members to one of the cooperating members, means for securing separated portions of the other disc-like member to the other cooperating member and linkage between the disc-like members, having one arm rigidly secured to separated portions of one of the connecting members and another arm spaced from the first and rigidly secured to separated portions of the other connecting member, the points of attachment of the linkage arms being substantially at right angles to the points of attachment of the disc-like members with the cooperating members.

2. A pivotal connection for cooperating members comprising flexible disc-like connecting members, means for rigidly securing separated portions of one of said members to one of the cooperating members, means for securing separated portions of the other disc-like member to the other cooperating member and linkage between the disc-like members, having one arm rigidly secured to separated portions of one of the connecting members and another arm spaced from the first and rigidly secured to separated portions of the other connecting member, the arms of the linkage being in substantial parallelism.

3. A pivotal connection for cooperating members comprising flexible disc-like connecting members, means for rigidly securing separated portions of one of said members to one of the cooperating members, means for securing separated portions of the other dis-like member to the other cooperating member and linkage between the disc-like members, having one arm rigidly secured to separated portions of one of the connecting members and another arm spaced from the first and rigidly secured to separated portions of the other connecting member, said points of attachment of the linkage arms being substantially at right angles to the points of attachment of the disc-like members with the cooperating members, and the arms of the linkage being in substantial parallelism.

4. A pivotal connection between cooperating members comprising flexible disc-like connecting elements, a compression link having an arm secured to separated portions of one of the connecting elements and a substantially parallel arm secured to separated portions of the other connecting element and means for securing separated portions of the respective elements to the cooperating members aforesaid.

5. A pivotal connection for cooperating members comprising flexible connecting elements, a suspension link having one arm rigidly secured to separated portions of one of said elements and a substantially parallel arm rigidly secured to separated portions of the other connecting element and means for securing separated portions of the respective elements to the cooperating members aforesaid.

6. The combination with a vehicle body and a supporting spring therefor, of a rigid spacer interposed between the body and spring and flexible fabric interposed between the body and the spacer and between the spring and the spacer and hingedly connecting the spacer to the body and to the spring at separated points.

7. In a shackle for connecting the spring and body of a vehicle with provision for relative rocking and bodily movement, in combination, a spacer interposed between the body and the spring and sustaining the weight of the body in compression, and means formed of flexible material securing the spacer to the body and to the spring.

8. In combination, a plurality of relatively movable members, and a shackle coupling said members with provision for relative rocking and bodily movement, said shackle comprising a spacer, and means flexibly connecting the members, the construction and arrangement of the spacer and the flexible connecting means being such that rubbing engagement of parts is avoided.

9. In combination, a supporting member, a supported member and a flexible shackle coupling said members, said shackle comprising a rockable spacer interposed between the members, and flexible tension means for holding the members against separation.

10. In an automobile, the combination with a spring and body member supported from said spring, of a compression shackle coupling said spring and body member with provision for relative rocking and bodily movement, said shackle comprising a spacer and a strap flexibly connecting the spring and body members, the construction and arrangement of the spacer and the flexible strap being such that frictional engagement of the parts is avoided.

11. In a shackle for connecting the spring and body of a vehicle with provision for relative rocking and bodily movement, in combination, a spacer interposed between the body and the spring and sustaining the weight of the body in compression, and means formed of flexible, non-metallic material securing the spacer to the body and to the spring.

12. In a shackle for connecting the spring and body parts of a vehicle with provision for relative pivotal and longitudinal movement of the spring with relation to the body, said shackle comprising a spacing member interposed between the said parts and sustaining the weight of the body in compression, and flexible fabric material associated with said spacing member, said material having greater width than thickness and being disposed to prevent side sway of the body.

13. In a shackle for connecting the spring and body of a vehicle with provision for relative pivotal and longitudinal movement of the spring with relation to the body, said shackle comprising a spacing member interposed between the body and the spring and sustaining the weight of the body in compression and a strip of flexible fabric clamped at spaced points to the body and the spring, the flexing of the material serving to permit limited movement of the spring with relation to the body in a direction longitudinally of the spring, said strip having its flat face disposed to prevent side sway of the body.

14. In a shackle for connecting the spring and body of a vehicle with provision for relative pivotal and longitudinal movement of the spring with relation to the body, said shackle comprising a spacing member interposed between the said parts and sustaining the weight of the body in compression, and flexible fabric of greater width than thickness clamped to be immovable in operation with respect to each of said parts at the area at which it is clamped in relation to said part, the plane of said material being disposed to prevent side sway of the body.

15. In a shackle for connecting the spring and body parts of a vehicle, a spacing member sustaining the weight of the body in compression, means for securing said member fixedly to the said parts to enable said member to hold said parts together, both under compression and tension strains, said spacer comprising non-metallic material capable of yielding to permit both pivotal and longitudinal movements of the spring with relation to the body.

16. In combination, a plurality of relatively movable members and a shackle coupling said members with provision for relative rocking and bodily movement, said shackle comprising a spacer and means flexibly connecting the members, the construction and arrangement of the spacer and the flexible connecting means being such that relative movement of engaging metallic parts is avoided.

17. In a motor vehicle, the combination with spring and body members thereof, of a shackle providing for relative rocking and bodily movement of the spring and body members, comprising a rigid link and distortable, non-metallic material connecting the link at spaced points to the spring and body members respectively, said distortable material serving to insulate the link against metal to metal contact with the spring and body members, and providing solely by distortion for pivotal movement of the link relative to the spring member and to the body.

18. In a motor vehicle, the combination with spring and body members thereof, of a shackle providing for relative rocking and bodily movement of the spring and body members, comprising a rigid link and distortable, non-metallic material connecting the link at spaced points to the spring and body members respectively, the distortable material at one end of the link serving to insulate the link against metal to metal contact with the spring member, and to provide solely by distortion for pivotal movement of the link relative to the spring member, and the distortable material at the opposite end of the link serving to insulate the link against metal to metal contact with the body member, and to provide solely by distortion for pivotal movement of the link relative to the body member.

In testimony whereof I have affixed my signature to this specification.

HARVEY W. BELL.